US009829015B2

(12) United States Patent
Stephan et al.

(10) Patent No.: US 9,829,015 B2
(45) Date of Patent: Nov. 28, 2017

(54) HYDRAULIC VALVE ARRANGEMENT WITH CONTROL/REGULATING FUNCTION

(71) Applicant: Liebherr-Mining Equipment Colmar SAS, Colmar (FR)

(72) Inventors: Patrick Stephan, Crésuz (CH); Pascal Progin, Vuadens (CH); Michael Deeken, Satteins (AT); Volker Gliniorz, Freiburg im Breisgau (DE); Phlipp Hahn, Turckheim (FR)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 290 days.

(21) Appl. No.: 14/547,527

(22) Filed: Nov. 19, 2014

(65) Prior Publication Data

US 2015/0135699 A1 May 21, 2015

(30) Foreign Application Priority Data

Nov. 19, 2013 (CH) ...................................... 1930/13

(51) Int. Cl.

| | |
|---|---|
| ***F16D 31/02*** | (2006.01) |
| ***F15B 13/04*** | (2006.01) |
| ***F15B 13/044*** | (2006.01) |
| ***F15B 11/00*** | (2006.01) |
| ***F15B 13/042*** | (2006.01) |

(52) U.S. Cl.

CPC ........ *F15B 13/0417* (2013.01); *F15B 11/006* (2013.01); *F15B 13/0402* (2013.01); *F15B 13/044* (2013.01); *F15B 13/0405* (2013.01); *F15B 13/0426* (2013.01); *F15B 2211/20576* (2013.01); *F15B 2211/30575* (2013.01); *F15B 2211/329* (2013.01); *F15B 2211/353* (2013.01); *F15B 2211/365* (2013.01); *F15B 2211/41518* (2013.01); *F15B 2211/5059* (2013.01); *F15B 2211/761* (2013.01); *Y10T 137/87169* (2015.04)

(58) Field of Classification Search

CPC .............. F15B 13/0417; F15B 13/0302; F15B 13/0405; F15B 13/0426; F14B 2211/30575

USPC ........................................................... 60/428

See application file for complete search history.

(56) References Cited

U.S. PATENT DOCUMENTS

2010/0000209 A1* 1/2010 Wada .................... E02F 9/2203 60/413

* cited by examiner

*Primary Examiner* — Michael Leslie
*Assistant Examiner* — Daniel Collins
(74) *Attorney, Agent, or Firm* — Dilworth & Barrese, LLP

(57) ABSTRACT

The present invention relates to a hydraulic valve arrangement for controlling/regulating at least one hydraulic consumer of a mobile machine, with a summation interconnection of at least two hydraulic valves and at least one consumer interconnection of hydraulic valves, wherein the outputs of the summation interconnection are hydraulically connected with the inputs of the consumer interconnection, wherein at least one backflow valve is provided in the consumer interconnection. According to the invention, the at least one backflow valve for throttling a consumer return volume flow opens or closes in dependence on a consumer inflow pressure and comprises at least one main piston arranged in a bushing and at least two further pistons arranged in a lid separate from the bushing.

20 Claims, 8 Drawing Sheets

FIG. 1 CONTINUATION
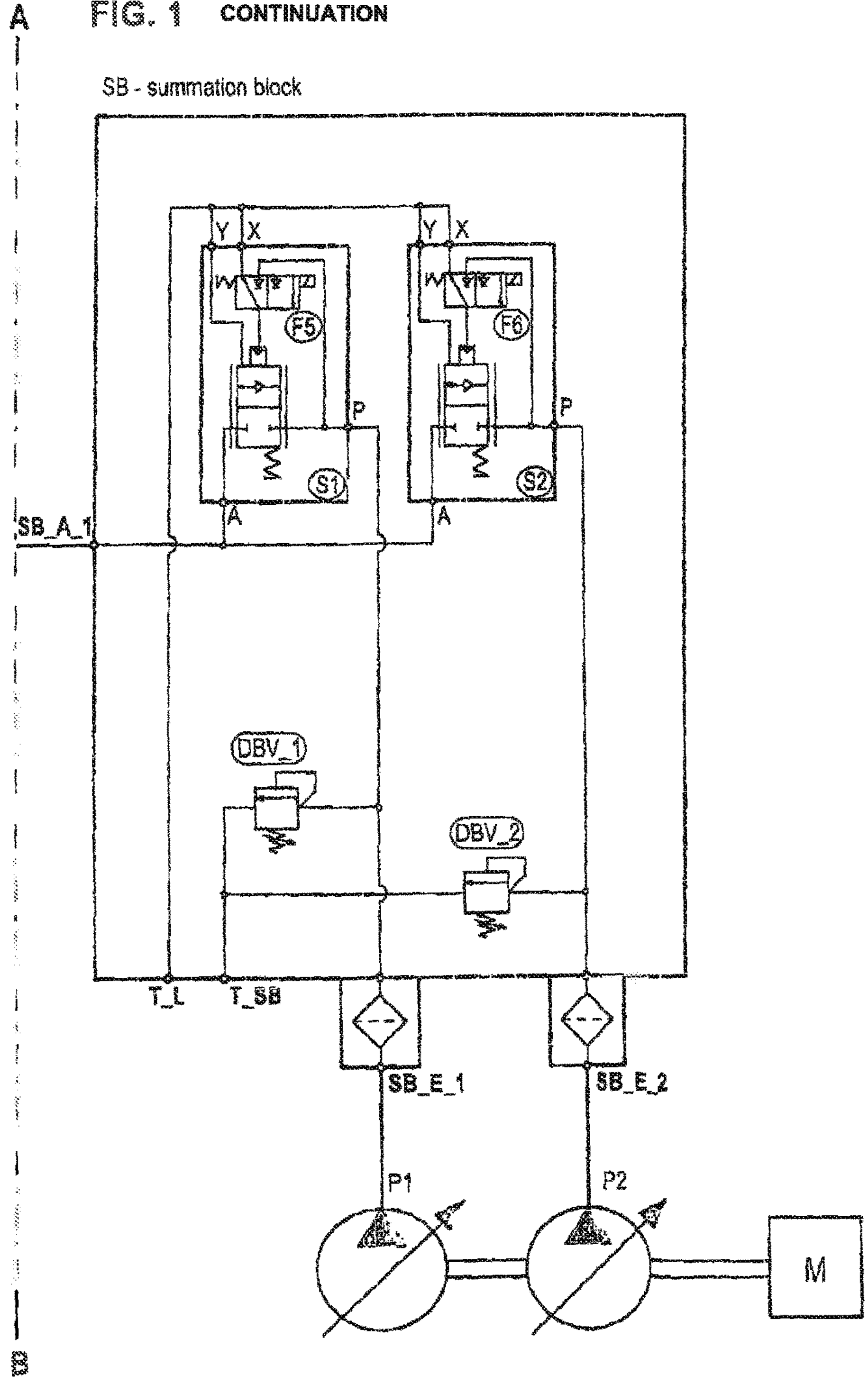

HYDRAULIC VALVE ARRANGEMENT WITH CONTROL/REGULATING FUNCTION

BACKGROUND OF THE INVENTION

The present invention relates to a hydraulic valve arrangement with control/regulating function, a backflow valve for the hydraulic valve arrangement, a hydraulic drive system with at least one hydraulic valve arrangement, and a mobile machine with the hydraulic drive system.

Seat valves in cartridge construction are available on the market today in a variety of designs. Various manufacturers offer a wide product range of seat valves from very small ones up to very large nominal sizes. It has turned out that seat valves of small nominal sizes frequently are used in pilot control systems of hydraulic circuits. This applies both for mobile and for stationary hydraulic systems. Seat valves for high oil volume flows chiefly are used in stationary hydraulic systems.

The available seat valves in cartridge construction mostly are controlled by external signals (pressure signals, electrical signals) and need to be included in the system via an external control unit. This means that cartridge valves existing today do not have the functions mentioned below, which are necessary for the use in a mobile machine. When the existing cartridge valves are to be used in a hydraulic control system of a mobile machine, it is found in a multitude of invention applications that an electronic or electric control unit always takes over the algorithms for performing the control/regulating functions of the hydraulic drives and correspondingly controls the valves.

As an example for such hydraulic control system for a machine, the publication DE 11 2004 001 916 T5 can be mentioned.

In general, hydraulic valves are provided to realize functions for ensuring the proper operation of the hydraulic consumers within the hydraulic control system of a mobile machine (excavator, wheel loader, crane, etc.). The functions of the hydraulic valves differ by the types of valve (summation valves, inflow valves and backflow valves).

Within a hydraulic control system in particular of a mobile machine, the novel hydraulic valves have the task of realizing the control of oil volume flows in dependence on specific states within the hydraulic system and of external control signals.

This connection should be realized as a function of the backflow valve within the consumer interconnection. The backflow valve should open or close in dependence on the consumer inflow pressure, in order to throttle the consumer return volume flow such that a corresponding consumer inflow pressure is maintained. Thus, the backflow valve should be adjusted directly by the hydraulic consumer inflow pressure.

SUMMARY OF THE INVENTION

According to the invention, this object is solved by a hydraulic valve arrangement for controlling/regulating at least one hydraulic consumer of a mobile machine with the features herein, comprising a summation interconnection of at least two hydraulic valves and at least one consumer interconnection of hydraulic valves, wherein the outputs of the summation interconnection are hydraulically connected with the inputs of the consumer interconnection, wherein at least one backflow valve is provided in the consumer interconnection, wherein for throttling a consumer return volume flow the at least one backflow valve opens or closes in dependence on a consumer inflow pressure and comprises at least one main piston arranged in a bushing as well as at least two further pistons arranged in a lid separate from the bushing.

In a preferred exemplary embodiment it is conceivable that the at least one backflow valve includes a pressure limitation function for limiting the consumer pressure to a maximum pressure level.

In a further preferred exemplary embodiment it is conceivable that the hydraulic valve arrangement throttles the consumer return volume flow in dependence on external control signals.

In a further preferred exemplary embodiment it is conceivable that at least one summation valve/inflow valve is arranged in the summation interconnection and/or the consumer interconnection, wherein the at least one summation valve/inflow valve comprises at least two pistons, wherein a main piston and a recoil piston are arranged in components designed separate from each other.

In a further exemplary embodiment it is conceivable that the summation interconnection adds up or separates volume flows supplied to the same on outputs provided at the same.

It thereby advantageously becomes possible to release volume flows to the consumers connected to the summation interconnection depending on demand.

In a further preferred exemplary embodiment it is conceivable that the consumer interconnection is designed for controlling/regulating the directions of movement of at least one hydraulic consumer, and/or that in the consumer interconnection at least one summation valve/inflow valve and at least one backflow valve is provided for each direction of movement of the at least one hydraulic consumer.

In a further preferred exemplary embodiment it is conceivable that in the consumer interconnection two summation valves/inflow valves and two backflow valves are provided.

The invention furthermore is directed to a backflow valve for a hydraulic valve arrangement according to the features herein.

The present invention also is directed to a hydraulic drive system with at least one hydraulic valve arrangement according to the features herein with at least one hydraulic consumer, wherein the at least one hydraulic consumer is hydraulically connected with the consumer interconnection and/or with at least two hydraulic pumps, wherein the hydraulic pumps are hydraulically connected with the summation interconnection.

The invention furthermore is directed to a mobile machine with a hydraulic drive system according to the features herein.

BRIEF DESCRIPTION OF THE DRAWINGS

Further details and advantages of the invention will now be explained in detail with reference to exemplary embodiments illustrated in the Figures, in which.

DESCRIPTION OF THE PREFERRED EMBODIMENTS

Figure 1:
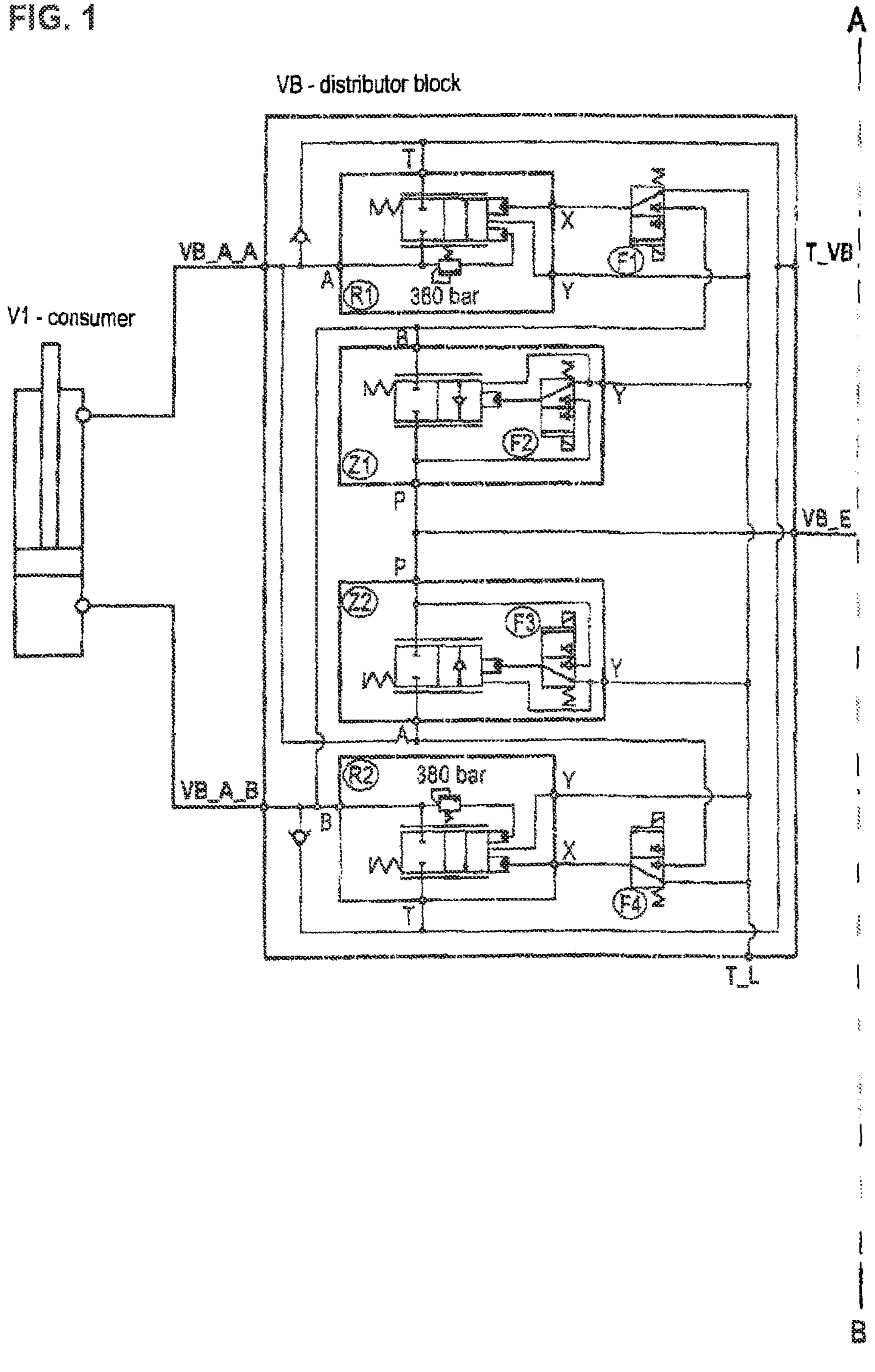
FIG. 1: shows a schematic structure of a hydraulic drive system.

The hydraulic control system can be configured as shown in FIG. 1. The hydraulic control system shown consists of at least two hydraulic pumps, a summation interconnection of at least two hydraulic valves, at least one consumer interconnection of hydraulic valves, and at least one hydraulic consumer (linear drive, rotational drive).

The hydraulic pumps are hydraulically connected with the summation interconnection. By the summation interconnection, the volume flows of the hydraulic pumps can be added up or separated on correspondingly existing outputs of the summation interconnection. The summation interconnection can be arranged in a summation block or be realized by individual valve block arrangements. When realized by individual valve blocks, the valve blocks are connected with each other by hydraulic lines (tubes or hoses).

The outputs of the summation interconnection are hydraulically connected with the inputs of the consumer interconnection. The outputs of the consumer interconnection are connected with the respective hydraulic consumers. The consumer interconnection serves for adjusting the direction of movement of a hydraulic consumer by selectively connecting the consumer ports either with the tank backflow or the inflow volume flows of the hydraulic pumps. The consumer interconnection can be arranged in a distributor block, so that for each consumer present in the hydraulic control system at least one distributor block performs the necessary functions. The consumer interconnection can, however, also be implemented by individual valve block arrangements, so that the hydraulic connections between the individual valve blocks are realized by hydraulic lines (tubes or hoses). It is also possible that several parallel distributor interconnections are provided for a hydraulic consumer.

A similar system structure has been described already in the application DE 10 2012 004 012.1.

Within the described hydraulic control system, the novel hydraulic valves should be usable in the form of different types of valve. They should be used either as summation valves within the summation interconnection, as inflow valves within the distributor interconnection and/or as backflow valves within the distributor interconnection.

The inflow valves and backflow valves of a distributor interconnection should be used within the hydraulic control system for controlling the directions of movement of hydraulic consumers (linear drives, rotational drives). These hydraulic valves should be arranged such that for each direction of movement at least one inflow valve and at least one backflow valve can adjust the direction of movement of the hydraulic consumer. Thus, for each direction of movement at least one inflow valve (FIG. 1—Z1 and Z2) should be able to establish the connection between an inflowing pump volume flow (primary side) and the respective consumer port (secondary side). At the same time, at least one backflow valve (FIG. 1—R1 and R2) for each direction of movement correspondingly should be able to establish the connection between the respective consumer port (secondary side) and the tank backflow.

The summation valves serve the assignment of pump volume flows to the consumers. Several pump volume flows can be added up on a consumer and also be separated again.

To largely simplify the switching operations during the change of one summation state into another, the summation valves should include the following functions: The activation and deactivation of the function of the summation valves should be effected by an integrated solenoid switching valve (see FIG. 1—F5 and F6), which is actuated via an externally supplied electrical signal. When no control signal is applied, the summation valve should be deactivated, i.e. the valve is closed and cannot open. When a control signal is applied, it should be possible for the valve to open in dependence on the applied primary pressure (valve input) (primary pressure opening).

When the function of the summation valve is enabled by applying the electrical control signal, the same initially is closed. When a pressure is built up at the inlet of the valve (primary side), this leads to the valve opening (primary pressure opening function). When the pressure is decreased before the valve or a deactivation is effected, the valve closes.

Furthermore, the summation valves should have a recoil function, so that they will close, when the secondary pressure (pressure behind the summation valve) is higher than the primary pressure (pressure before the summation valve). This function has priority over the primary pressure opening function and is necessary in connection with the control of the summation valves.

Resulting from the application of the described hydraulic control system in a mobile machine, in particular in a hydraulic excavator, the control system for example should have the following functions, which should be integrated into the inflow valves:

The activation and deactivation of the function of the inflow valves should be effected by an integrated solenoid switching valve (see FIG. 1—F2 and F3), which is actuated via an externally supplied electrical signal. When no control signal is applied, the inflow valve should be deactivated, i.e. the valve is closed and cannot open. When a control signal is applied, it should be possible for the valve to open in dependence on the applied primary pressure (valve input) (primary pressure opening).

When the function of the inflow valve is enabled by applying the electrical control signal, the same initially is closed. When a pressure is built up at the inlet of the valve (primary side), this leads to the valve opening. When the pressure is decreased before the valve or a deactivation is effected, the valve closes.

Furthermore, the inflow valves should have a recoil function, so that they will close, when the secondary pressure (pressure behind the inflow valve) is higher than the primary pressure (pressure before the inflow valve). This function has priority over the primary pressure opening function and is necessary in the inflow valves for implementing a load-holding function of the consumers. The recoil function blocks a backflow of the primary-side volume flow into the pumps. It thereby is prevented on the one hand that the consumer sinks down due to a leakage by the pumps, and on the other hand the pumps are protected from pressure peaks proceeding from the consumer.

In its application in a mobile machine, the hydraulic control system should be able to operate free from faults for various types of consumer (in a hydraulic excavator with backhoe equipment: hoisting cylinder, arm cylinder, bucket cylinder and traveling gear drives, etc.) in the four performance quadrants. Accordingly, hydraulic consumers must be able to pick up positive and negative loads in both directions of movement (in hydraulic linear drives: retraction/extension; in hydraulic rotational drives: counterclockwise/clockwise).

In the case of negative loads, a device must be provided in the hydraulically open circuit of a hydraulic control system, which creates the possibility of braking the hydraulic consumer and adapt the same to its specified velocity, which is characterized by an imparted volume flow of the connected hydraulic pumps (outflow control). It should thereby be avoided that the hydraulic consumer is spontaneously accelerated by external loads. This would lead to a negative pressure on the primary side of the consumer, which can cause cavitation in the hydraulic control system. Due to the occurrence of cavitation, the hydraulic system components can be damaged, which should be avoided in any case.

This connection should be realized as a function of the backflow valve within the consumer interconnection. The backflow valve should open or close in dependence on the consumer inflow pressure, in order to throttle the consumer return volume flow such that a corresponding consumer inflow pressure is maintained. Thus, the backflow valve should be adjusted directly by the hydraulic consumer inflow pressure.

In its application in a mobile machine for various types of consumer (in a hydraulic excavator with backhoe equipment: hoisting cylinder drive, arm cylinder drive, bucket cylinder drive, traveling gear drives, etc.) the hydraulic control system should be provided with a secondary pressure limitation function. This function limits the consumer pressure (secondary pressure) to a maximum pressure level, in order to protect the hydraulic control system from overload of the individual hydraulic components. In the structure of a hydraulic control system as shown in FIG. 1, this function should be integrated into the backflow valves R1 and R2 such that in the case of too high a consumer pressure these valves provide for an opening from the consumer pressure side to the tank and hence limit the consumer pressure to a specified pressure level.

The invention comprises the construction principles of the hydraulic valves, which provide for realizing the required and above-described functions for use in a hydraulic control system according to FIG. 1, in order to be used in a mobile machine.

Figure 2:
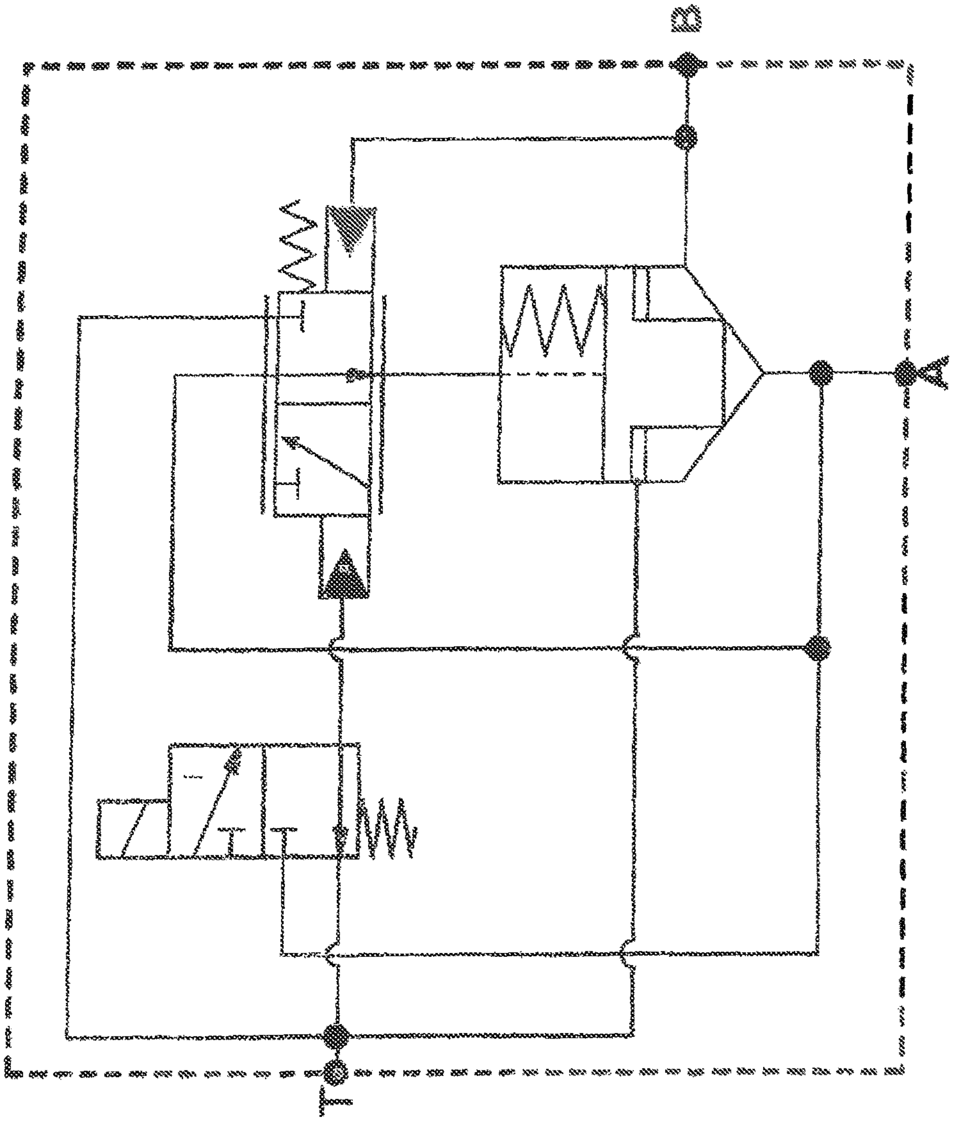
FIG. 2: shows a hydraulic circuit diagram of the summation valve/inflow valve.
Figure 3:
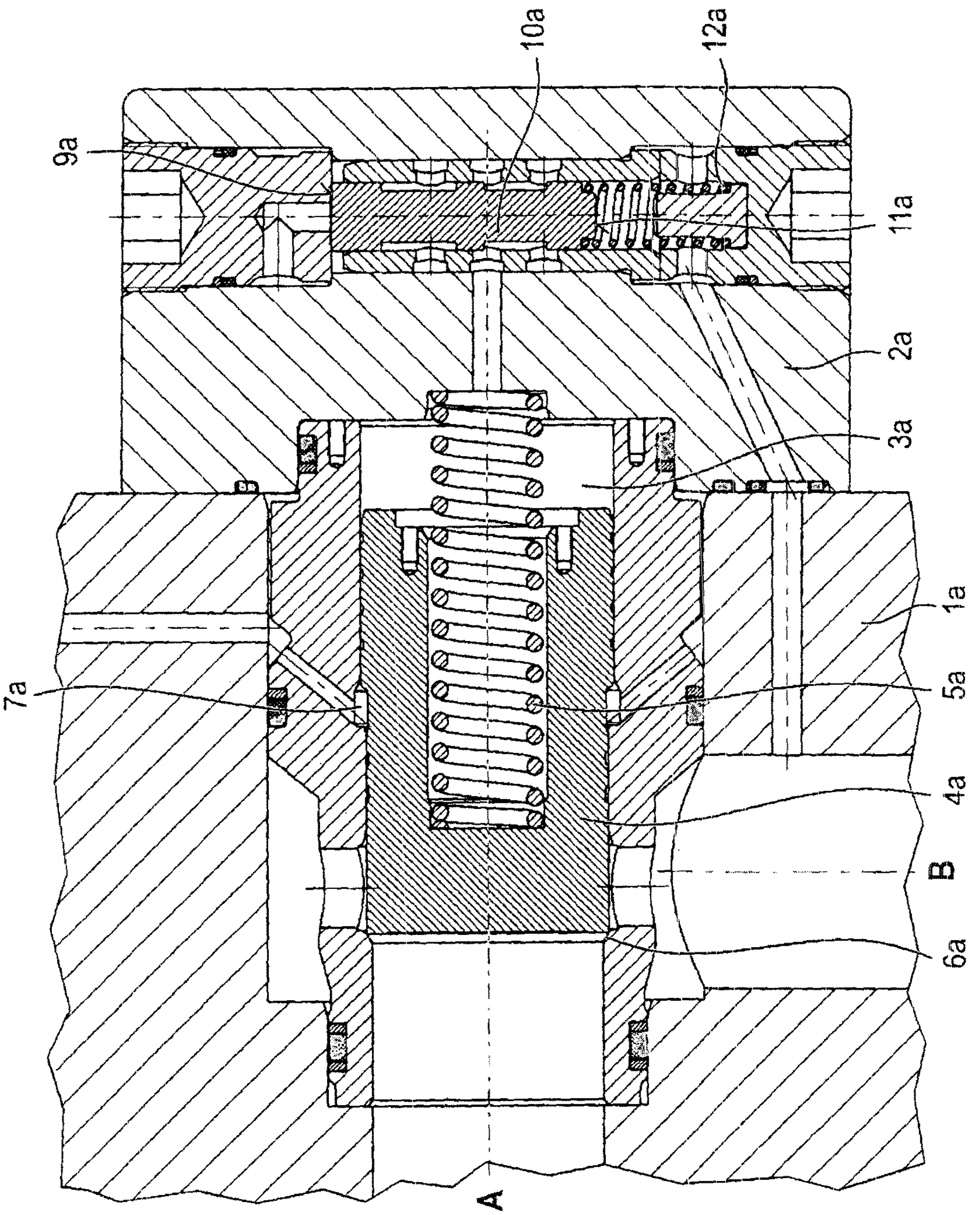
FIG. 3: shows a cross-section of the summation valve/inflow valve.

FIG. 2 shows the hydraulic circuit diagram and FIG. 3 a cross-section of the summation valve/inflow valve. These two valves (summation and inflow valves) are identical in their constructive design and their mode of operation.

The entire valve construction is designed according to the principle of a built-in valve and is inserted into the valve block 1*a* into the standardized bore according to DIN ISO 7368 and fixed with a lid 2*a*. The axial positioning ensures the connection of the valve ports inflow A, outflow B and tank port T. The structure shown here is traversed exclusively from port A to B. When pressure is applied at port A, this pressure likewise is passed on through a connecting bore via recoil pistons 10*a* into the spring chamber 3*a*. Thus, the same pressures are applied on the two surfaces of the main piston 4*a*. Since the upper diameter of the main piston 4*a* is designed greater than the lower diameter, a force always acts on the main piston, which presses the same down onto the seat 6*a*. By the main spring 5*a*, which is biased, a further force is generated onto the main piston 4*a*, which acts downwards. In the unopened condition, the main piston 4*a* thus is pressed into the valve seat 6*a* by these two forces. The annular groove 7*a* always is connected to the tank.

With unactuated release valve 8*a*, only shown in FIG. 2, the surface 9*a* of the recoil piston 10*a* is pressurized with tank pressure. Through a connecting bore, the pressure of port B is applied on the second surface 11*a* of the recoil piston 10*a*. Together with the spring 12*a*, the same acts against the pressure on the opposite surface 9*a* of the recoil piston 10*a*. Due to this pressurization of the recoil piston 10*a*, a comparison of the pressures at ports A and B is possible. When the recoil piston 10*a* is unactuated, a bore releases a connection of the spring chamber 3*a* and the high pressure, the valve remains closed. On actuation/release of the summation valve/inflow valve, a pressure is passed through the release valve 8*a* from port A onto the surface 9*a* of the recoil piston 10*a*, and a connection is created between the spring chamber 3*a* and the tank. The pressure in the spring chamber 3*a* is decreased, which leads to a stroke of the main piston 4*a* and clears a connection between ports A and B. When the release valve 8*a* is deactivated, a connection between high pressure and the spring chamber 3*a* again is created by the recoil piston 10*a*. As a result, the main piston 4*a* again moves into the valve seat 3*a* and thus closes the control edge. The flow between ports A and B is blocked.

When the main control edge is opened and the pressure on port B rises above the pressure on port A, the ratio of forces pushes the recoil piston 10*a* into the same position as if the release valve 8*a* were deactivated. Via the connection with the recoil piston 10*a*, the spring chamber 6*a* thereby is pressurized with high pressure, whereby the main control edge is closed. When the pressure on port A again rises above the pressure on port B, the recoil piston 10*a* again is pressed into the stop via the surface 9*a*, the connection to the tank is established, and the main control edge opens again.

Figure 4:
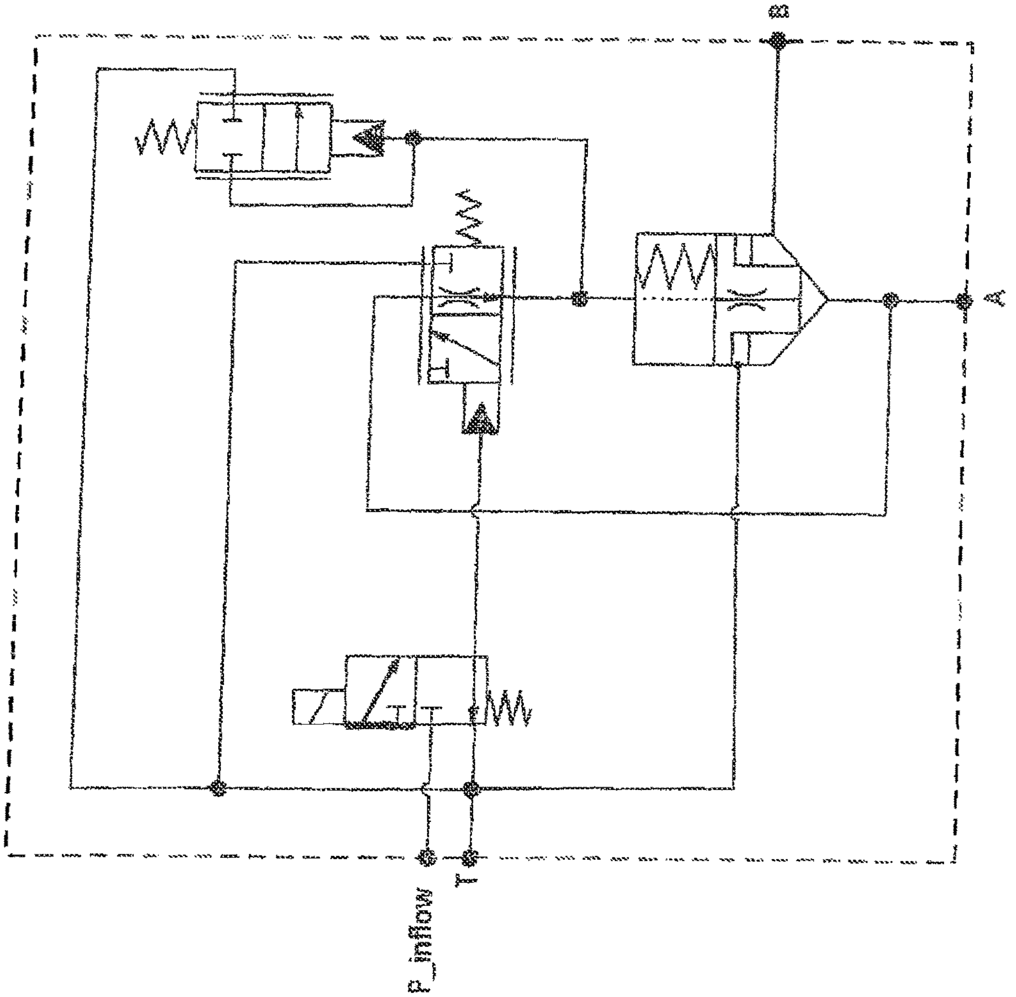
FIG. 4: shows a hydraulic circuit diagram of the backflow valve.
Figure 5:
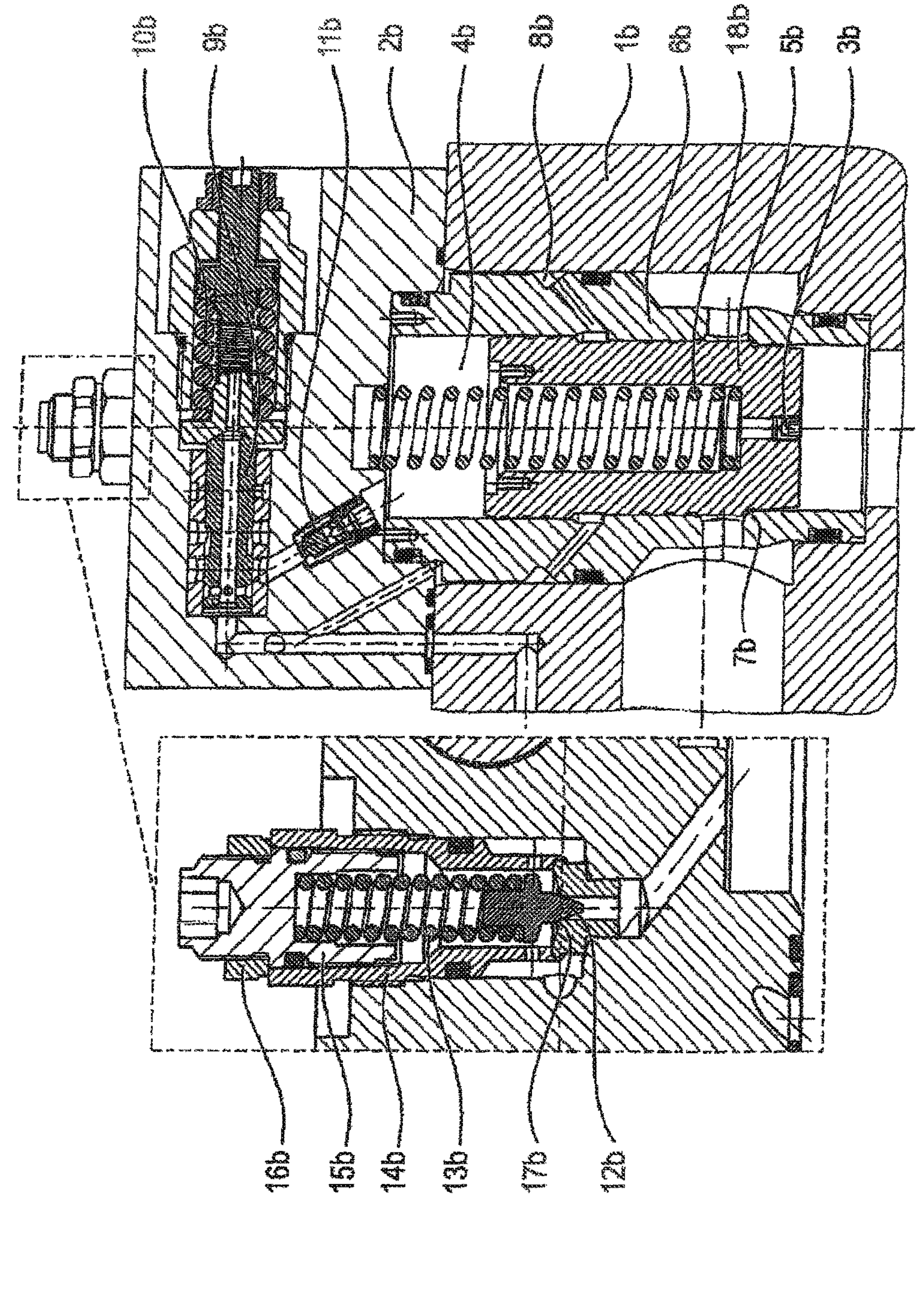
FIG. 5: shows a cross-section of the backflow valve.

FIG. 4 shows the hydraulic circuit diagram and FIG. 5 a cross-section of the backflow valve.

The entire valve construction is designed according to the principle of a built-in valve and is inserted into the valve block 1*b* into the standardized bore according to DIN ISO 7368 and fixed with a lid 2*b*. The axial positioning ensures the connection of the valve ports inflow A, outflow B, the connection to the inflow pressure (p_inflow) and the tank port T. The structure shown here is traversed exclusively from port A to B. When pressure is applied at port A, this pressure likewise is passed on through the connecting nozzle 3*b* into the spring chamber 4*b*. Thus, on the upper and the lower side of the main piston 5*b*, which can move axially in the bushing 6*b*, the same pressures are applied. Since the upper diameter of the main piston 5*b* is designed greater than the lower diameter, a force always acts on the main piston 5*b*, which presses the same downwards. By the main spring 18*b*, which is biased, a further force is generated onto the main piston 5*b*, which acts downwards. In the unopened condition, the main piston 5*b* thus is pressed into the valve seat 7*b* by these two forces. The annular groove 8*b* always is connected to the tank. In the release valve of the backflow valve (not shown in FIG. 5), the port of the valve in the deactivated condition is connected with the tank line T. When the backflow valve is activated, the connection to T is blocked and the port is connected with the pressure chamber (inflow pressure) opposite the backflow. The inflow pressure thereby gets onto the control surface of the control piston 9*b*. This leads to a movement of the control piston 9*b* against two biased springs 10*b* from a defined value. Depending on the height of the inflow pressure, an opening surface exists between the spring chamber 4*b* and the control piston 9*b*, the volume of the spring chamber 4*b* is passed to the tank, selectively via a shuttle valve 11*b*, in order to influence the opening or closing speeds. The pressure drop in the spring chamber effects a stroke of the main piston 5*b*. Depending on the position of the main piston 5*b*, an opening surface is cleared, which provides for traversing the valve from A to B.

When the inflow pressure (p_inflow) again drops below the defined value, the flow cross-section to the tank is blocked by the control piston 9*b* and connected with the high pressure. The pressure of port A therefore is applied in the spring chamber 4*b*, from where the same likewise is applied at the pressure limiting piston 12*b*. Via the adjusting mechanisms 14*b*, 15*b*, 16*b*, the same is biased with a spring 13*b* against the cone seat 17*b*. When the pressure on port A rises above an adjustable value, the pressure limiting cone 12*b* rises from the cone seat 17*b* and releases volume flow to the tank. The pressure in the spring chamber 4*b* thereby drops, which results in a force difference. Due to the force difference, the main piston 5*b* moves upwards and an opening surface between ports A and B is cleared. Based on this opening surface and the pressure difference between ports A and B, a volume flow is flowing, which leads to the fact that the pressure in port A is decreased.

Figure 6:
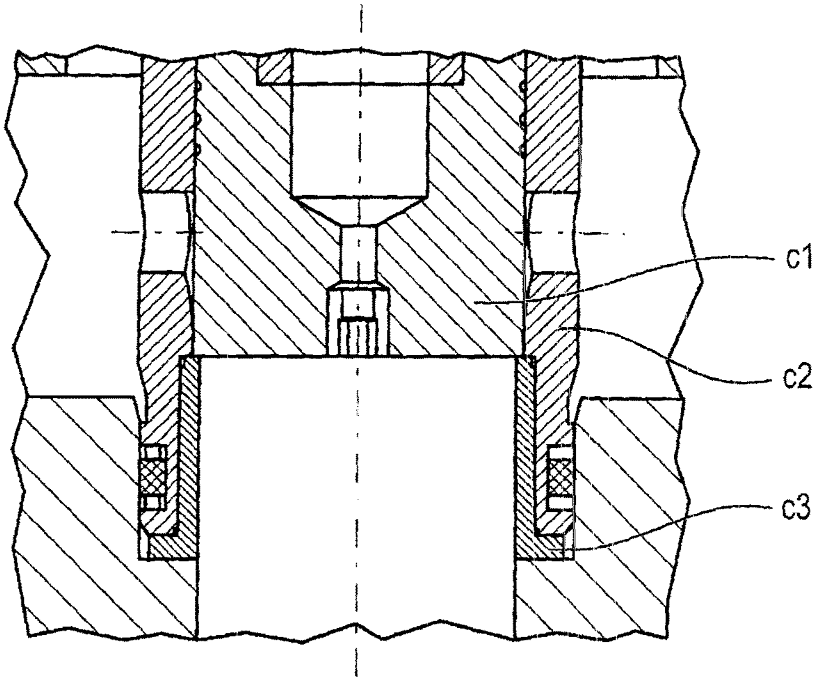
FIG. 6: shows an opening cross-section in the seat sleeve with valve seat pressed in (version A)

As shown in FIG. 6, the opening cross-section of the valve is determined by the axial position of the piston c1 in combination with the design of the seat sleeve c2. Due to different designs of the piston c1 and the seat sleeve c2, four combinations A, B, C and D are described below, which can equally be used for generating the opening surface of the inflow valve and of the backflow valve.

In FIG. 6 the design of version A is shown. On the inside of the valve sleeve c2 a form turning is incorporated, which depending on the axial position of the piston c1 determines the flow cross-section. The sealing seat of the valve is realized by a sleeve c3, which is pressed into the valve sleeve c2 from below and on which the edge of the end face of the piston c1 rests, when the valve is closed.

Figure 7:
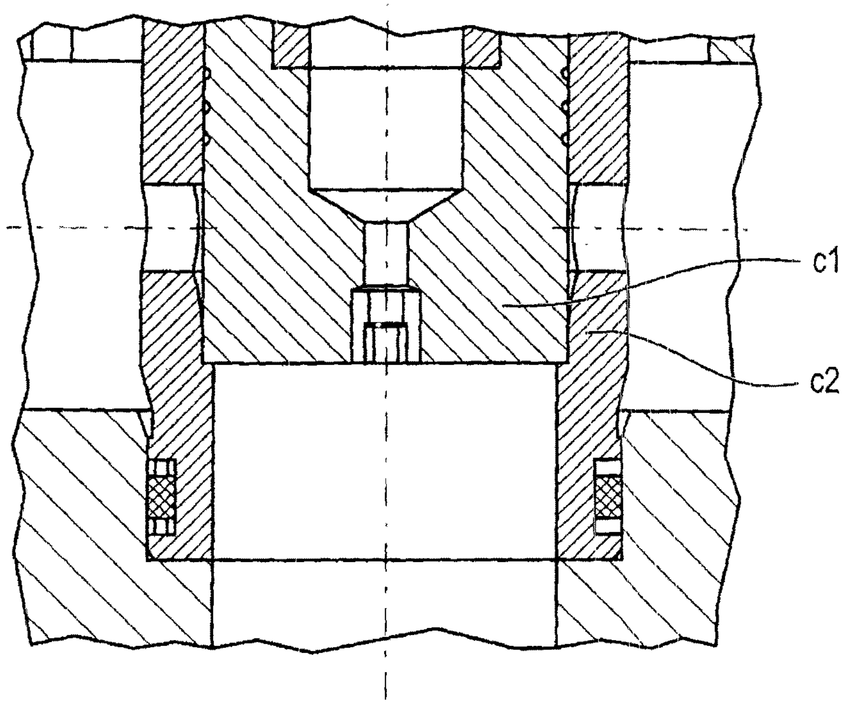
FIG. 7: shows an opening cross-section in the seat sleeve with integrated valve seat (version B)

The version B for generating the opening surface is shown in FIG. 7. On the inside of the valve sleeve c2 a form turning is incorporated, which depending on the axial position of the piston c1 determines the flow cross-section. The sealing seat of the valve is directly incorporated into the seat sleeve c2 by a corresponding formation on which the end face of the piston c1 rests, when the valve is closed.

Figure 8:
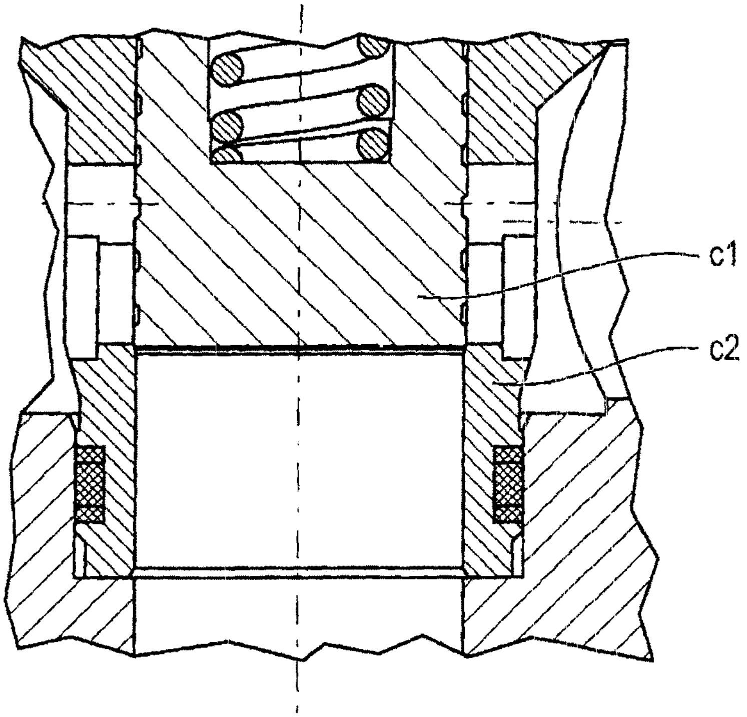
FIG. 8: shows an opening cross-section in the seat sleeve with form milling (version C)

The version C for generating the opening surface is shown in FIG. 8. In the valve sleeve c2 a form milling is incorporated, which depending on the axial position of the piston c1 determines the flow cross-section. The sealing seat of the valve is directly incorporated into the seat sleeve c2 by a corresponding formation on which the end face of the piston c1 rests, when the valve is closed.

Figure 9:
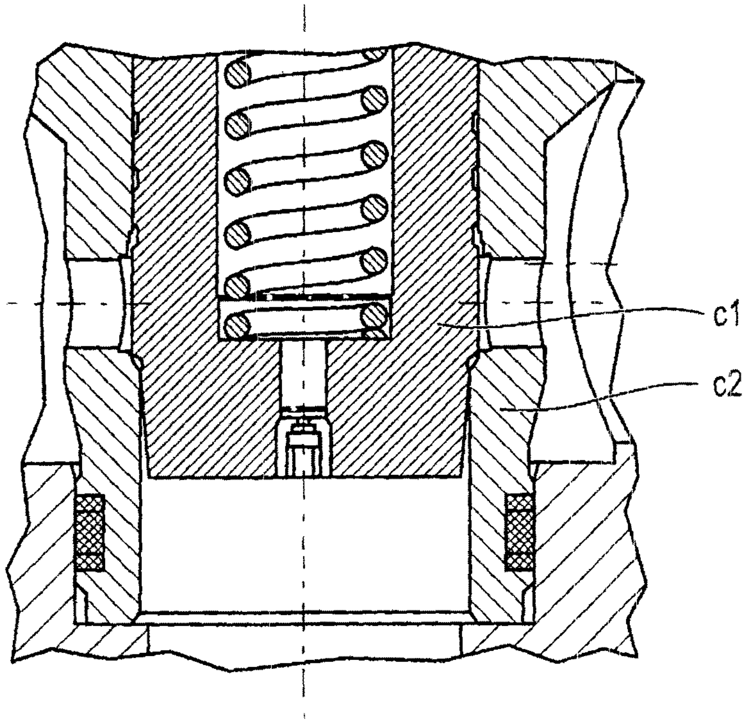
FIG. 9: shows an opening cross-section, generated by form turning at the piston (version D).

The version D for generating the opening surface is shown in FIG. 9. Here, a form turning is mounted on the piston c1, which depending on its axial position, in combination with the seat sleeve c2, determines the opening cross-section of the valve. The sealing seat of the valve is realized by a corresponding formation on the piston c1 and in the seat sleeve c2.

The invention claimed is:

1. A hydraulic valve arrangement for controlling/regulating at least one hydraulic consumer (V1) of a mobile machine, with a summation interconnection of at least two hydraulic valves and at least one consumer interconnection of hydraulic valves, wherein the outputs of the summation interconnection are hydraulically connected with the inputs of the consumer interconnection, at least one backflow valve (R1, R2) is provided in the consumer interconnection, and for throttling a consumer return volume flow, the at least one backflow valve (R1, R2) opens or closes in dependence on a consumer inflow pressure and comprises at least one main piston (5*b*) arranged in a bushing (6*b*) as well as at least two further pistons (9*b*, 12*b*) arranged in a lid (2*b*) separate from the bushing (6*b*).

2. The hydraulic valve arrangement according to claim 1, wherein the at least one backflow valve (R1, R2) includes a pressure limitation function for limiting the consumer pressure to a maximum pressure level.

3. The hydraulic valve arrangement according to claim 1, wherein the hydraulic valve arrangement throttles the consumer return volume flow in dependence on external control signals.

4. The hydraulic valve arrangement according to claim 1, wherein at least one summation valve/inflow valve (S1, S2, Z1, Z2) is arranged in the summation interconnection and/or the consumer interconnection, the at least one summation valve/inflow valve (S1, S2, Z1, Z2) comprises at least two pistons (4*a*, 10*a*), and a main piston (4*a*) and a recoil piston (10*a*) are arranged in components designed separate from each other.

5. The hydraulic valve arrangement according to claim 1, wherein the summation interconnection adds up or separates volume flows supplied to the same on outputs provided at the same.

6. The hydraulic valve arrangement according to claim 1, wherein the consumer interconnection is designed for controlling/regulating the directions of movement of at least one hydraulic consumer (V1), and/or in the consumer interconnection at least one summation valve/inflow valve (S1, S2, Z1, Z2) and at least one backflow valve (R1, R2) is provided for each direction of movement of the at least one hydraulic consumer (V1).

7. The hydraulic valve arrangement according to claim 1, wherein in the consumer interconnection two summation valves/inflow valves (S1, S2, Z1, Z2) and two backflow valves (R1, R2) are provided.

8. A backflow valve (R1, R2) for a hydraulic valve arrangement according to claim 1.

9. A hydraulic drive system with at least one hydraulic valve arrangement according to claim 1, with at least one hydraulic consumer (V1), wherein the at least one hydraulic consumer (V1) is hydraulically connected with the consumer interconnection, and/or with at least two hydraulic pumps (P1, P2), and the hydraulic pumps (P1, P2) are hydraulically connected with the summation interconnection.

10. A mobile machine with a hydraulic drive system according to claim 9.

11. The hydraulic valve arrangement according to claim 2, wherein the hydraulic valve arrangement throttles the consumer return volume flow in dependence on external control signals.

12. The hydraulic valve arrangement according to claim 11, wherein at least one summation valve/inflow valve (S1 S2, Z1, Z2) is arranged in the summation interconnection and/or the consumer interconnection, the at least one summation valve/inflow valve (S1, S2, Z1, Z2) comprises at least two pistons (4*a*, 10*a*), and a main piston (4*a*) and a recoil piston (10*a*) are arranged in components designed separate from each other.

13. The hydraulic valve arrangement according to claim 3, wherein at least one summation valve/inflow valve (S1, S2, Z1, Z2) is arranged in the summation interconnection and/or the consumer interconnection, the at least one summation valve/inflow valve (S1, S2, Z1, Z2) comprises at least two pistons (4*a*, 10*a*), and a main piston (4*a*) and a recoil piston (10*a*) are arranged in components designed separate from each other.

14. The hydraulic valve arrangement according to claim 2, wherein at least one summation valve/inflow valve (S1, S2, Z1, Z2) is arranged in the summation interconnection and/or the consumer interconnection, the at least one summation valve/inflow valve (S1, S2, Z1, Z2) comprises at least two pistons (4*a*, 10*a*), and a main piston (4*a*) and a recoil piston (10*a*) are arranged in components designed separate from each other.

15. The hydraulic valve arrangement according to claim 14, wherein the summation interconnection adds up or separates volume flows supplied to the same on outputs provided at the same.

16. The hydraulic valve arrangement according to claim 13, wherein the summation interconnection adds up or separates volume flows supplied to the same on outputs provided at the same.

17. The hydraulic valve arrangement according to claim 12, wherein the summation interconnection adds up or separates volume flows supplied to the same on outputs provided at the same.

18. The hydraulic valve arrangement according to claim 11, wherein the summation interconnection adds up or separates volume flows supplied to the same on outputs provided at the same.

19. The hydraulic valve arrangement according to claim 4, wherein the summation interconnection adds up or separates volume flows supplied to the same on outputs provided at the same.

20. The hydraulic valve arrangement according to claim 3, wherein the summation interconnection adds up or separates volume flows supplied to the same on outputs provided at the same.

* * * * *